United States Patent [19]

Agrawal et al.

[11] Patent Number: 5,974,327
[45] Date of Patent: Oct. 26, 1999

[54] ADAPTIVE FREQUENCY CHANNEL ASSIGNMENT BASED ON BATTERY POWER LEVEL IN WIRELESS ACCESS PROTOCOLS

[75] Inventors: Prathima Agrawal, New Providence; Shalinee Kishore, Dayton, both of N.J.; Krishna M. Sivalingam, Pullman, Wash.

[73] Assignee: AT&T Corp., New York, N.Y.

[21] Appl. No.: 08/955,391

[22] Filed: Oct. 21, 1997

[51] Int. Cl.[6] .......................... H04B 1/10; H04M 11/100
[52] U.S. Cl. .............................. 455/452; 455/63
[58] Field of Search ..................... 455/450, 452, 455/522, 67.1, 67.3, 63

[56] References Cited

U.S. PATENT DOCUMENTS

| | | | |
|---|---|---|---|
| 5,487,174 | 1/1996 | Persson | 455/452 |
| 5,564,074 | 10/1996 | Juntti | 455/67.1 |
| 5,603,096 | 2/1997 | Gilhousen et al. | 455/522 |
| 5,862,489 | 1/1999 | Aalto | 455/522 |

*Primary Examiner*—Paul Loomis

[57] ABSTRACT

A method and system adapt scheduling priorities in a wireless communications system to conserve battery power in mobile stations operating within the system. A base station, within the system, receives battery power level information and other setup information from mobile stations operating within the service area of the base station during call setup procedures. Based on the battery power level information and other setup information, the base station assigns frequency channels to the mobile stations so that those mobile stations having battery power levels below a threshold value are assigned frequency channels that have lower interference levels than frequency channels assigned to other mobile stations. The frequency channel assignments are transmitted to the mobile stations.

22 Claims, 8 Drawing Sheets

ADAPTIVE FREQUENCY CHANNEL ASSIGNMENT BASED ON BATTERY POWER LEVEL IN WIRELESS ACCESS PROTOCOLS

TECHNICAL FIELD

This invention relates to telecommunications, and more particularly to a method and apparatus for managing mobile stations in a wireless network.

BACKGROUND

Currently, battery power conservation for mobile stations operating in a wireless communications system is a significant concern, especially for wireless service providers. This is due primarily to the significant amounts of power expended for wireless transmission by the mobile station transmitter. Revenue cannot be generated if mobile stations cannot complete calls due to their battery power being exhausted. One manual solution is the use of auxiliary power adapters to provide the power source needed for operation of the mobile station. However, this solution burdens wireless subscribers with additional costs and requires them to maintain a close proximity of the mobile station to the power source, to guarantee wireless service. Passive solutions to the problem involve scheduling the mobile station for sleep mode operation. The mobile station is instructed by the servicing base station to "wake up" at predetermined intervals to receive RF transmissions from the base station and to transmit RF signals to the base station. Although this solution does provide some relief, it also leads to significant over-the-air delays in the communications link since the base station and mobile station must continually buffer messages for longer periods. This delay is magnified further in a wireless communications system that operates on a reservation based protocol. Such a protocol directs mobile stations to use a limited number of channels at specific times to reduce interference and collisions in the wireless link.

Due to the limitations of the prior art, there is a need for a solution that takes a more active, direct role in managing mobile stations operating with low battery power levels.

SUMMARY

According to the present invention, a method and system adapt scheduling priorities in a wireless communications system to conserve battery power in mobile stations operating within the system. A base station, within the system, receives battery power level information and other setup information from mobile stations operating within the service area of the base station during call setup procedures. Based on the battery power level information and other setup information, the base station assigns frequency channels to the mobile stations so that those mobile stations having battery power levels below a threshold value are assigned frequency channels that have lower interference levels than frequency channels assigned to other mobile stations. The frequency channel assignments are transmitted to the mobile stations.

The mobile stations periodically transmit their current battery power levels to the base station. The base station, while scheduling frequencies, examines the received power levels and takes this infonnation into account.

The inventive method begins by receiving at the base station a signal from a mobile station that its battery power is below a threshold value. In response to this, the base station assigns a frequency channel to the mobile station that has a lower interference level than frequency channels assigned to other mobile stations. The base station then transmits the schedule to the mobile stations. This allows the mobile stations having lower battery power levels to transmit at lower power levels, thus conserving battery power. Transmitting on a channel with lower interference levels enables a mobile station to meet target bit error rates, despite low transmission power levels.

In another aspect of the invention, the base changes a mobile transmission schedule to cause transmission of messages from a mobile station having a lower battery power level to occur before transmission of messages from other stations. By advancing the scheduled transmission of messages from a mobile station whose battery power is low, those messages have a higher probability of successful transmission before the battery power level diminishes further.

In a further aspect of the invention, the mobile station can have a high priority message and a low priority message to transmit. In accordance with the invention, the base station changes the mobile transmission schedule to cause transmission of the high priority message to occur before transmission of high priority messages from other stations with higher battery power and to cause transmission of the low priority message to occur before transmission of low priority messages from other stations, but not before the transmission of high priority messages from other stations.

In still a further aspect of the invention, a first mobile station can have a first high priority message and a first low priority message to transmit and can have its battery power below a first threshold value. The base station can also receive a signal from a second mobile station that its battery power is below a second threshold value greater than the first threshold value. The second mobile station can have a second high priority message and a second low priority message to transmit. In accordance with the invention, the base station changes the mobile transmission schedule to cause transmission of the messages to be ordered with the first high priority, followed by the second high priority, followed by high priority messages from other stations, followed by the first low priority, followed by the second low priority, followed by low priority messages from other stations.

In this manner, the invention takes a more active, direct role in managing mobile stations operating with low battery power levels.

The discussion in this Summary and the following Brief Description of the Drawings, Detailed Description, and drawings only deal with examples of this invention and are not to be considered in any way a limitation on the scope of the exclusionary rights conferred by a patent which may issue from this application. The scope of such exclusionary rights is set forth in the claims at the end of this application.

DETAILED DESCRIPTION OF THE PREFERRED EMBODIMENTS

The invention disclosed herein solves the problem of efficient battery power consumption for mobile stations operating in a wireless communications environment. Some of the main sources of power consumption are the transmitter, receiver, the CPU, and the disk. In accordance with the invention, instead of passively or indirectly conserving battery power through the use of sleep or standby modes, the invention actively conserves battery power by both rescheduling the operations of the mobile station and reallocating frequency channels used by the mobile station so as to reduce interference levels. In response to a low battery power level and other communications criteria reported by an active mobile station, the invention assigns to the mobile station a frequency channel having a lower interference level. This assignment scheme allows mobile stations having lower remaining battery power to achieve the target SIR (Signal to Interference Ratio), while transmitting at lower power. Transmitting at lower power conserves the remaining battery power of the mobile station, while achieving the target SIR reduces the transmission error rate and thus, the amount of retransmission of data that must occur. In addition, the present invention enables the mobile station to transmit on particular radio channels with higher priority than other mobile stations having higher battery power levels. In a preferred embodiment, the invention is applied in a wireless communications system using a reservation-based wireless access protocol.

Figure 1:
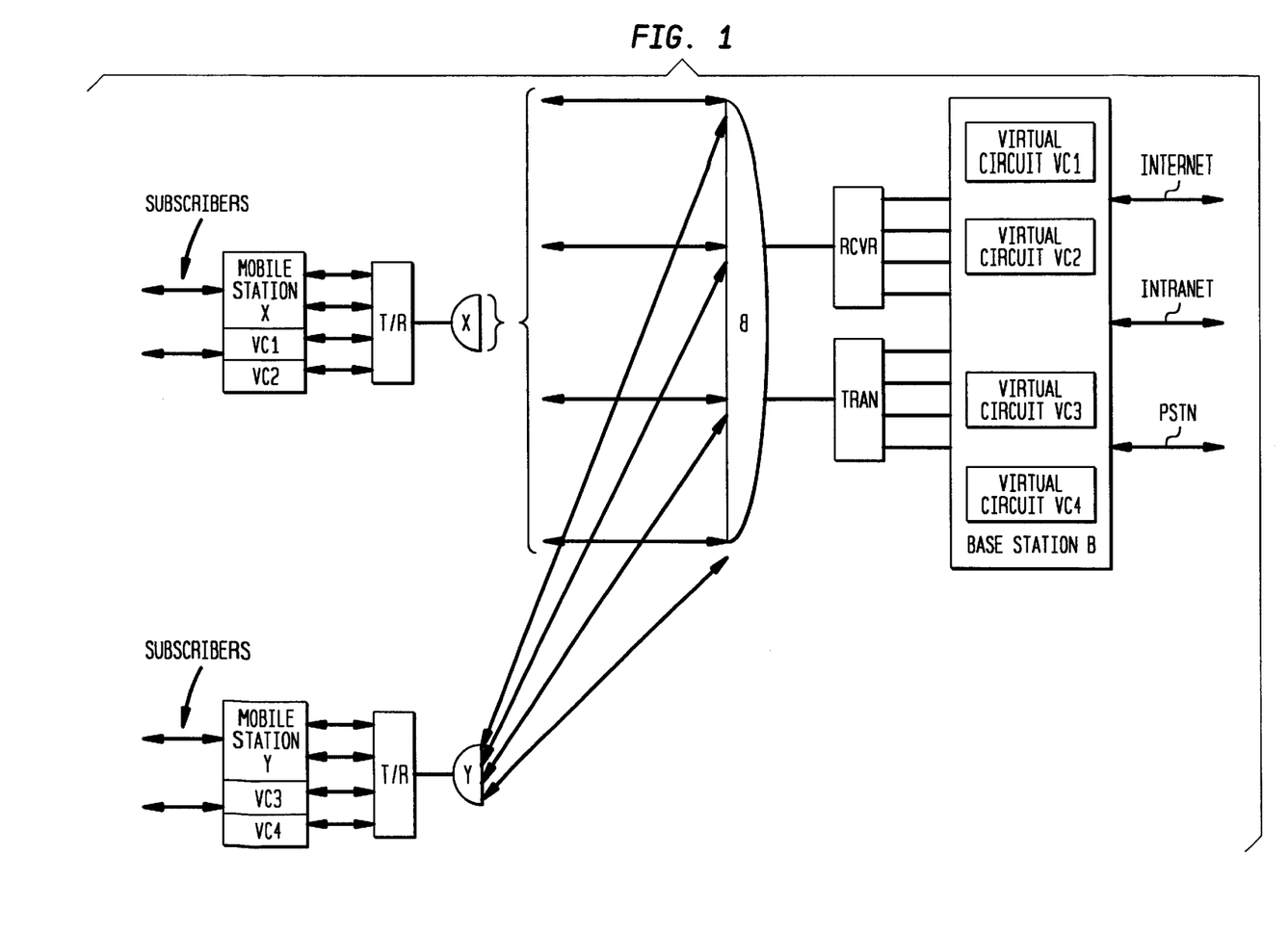
FIG. 1 is a network diagram of a wireless network, in accordance with the invention.

FIG. 1 is a network diagram of a wireless network, in accordance with the invention. Base station B may exchange voice, video and data message traffic with the Internet, with intranet LANs and WANs, and with the public switched telephone network (PSTN). Base station B is shown communicating that message traffic over a wireless link with mobile station X and mobile station Y. Base station B communicates the voice, video and data message traffic with mobile station X using virtual circuits VC1 and VC2 and it communicates the voice, video and data message traffic with mobile station Y using virtual circuits VC3 and VC4. Base station B transmits messages over the wireless link with its transmitter (TRAN) and antenna "B" and receives messages over the wireless link with its receiver (RCVR) and antenna "B". Mobile station X transmits and receives messages for its subscriber over the wireless link using its transmitter/receiver (T/R) and antenna "X". Mobile station Y transmits and receives messages for its subscriber over the wireless link using its transmitter/receiver (T/R) and antenna "Y". In a preferred embodiment of the invention, base station B, mobile station X, and mobile station Y use a combination of frequency and time division multiple access protocols with a reservation mechanism to exchange messages over the wireless link.

Figure 2:
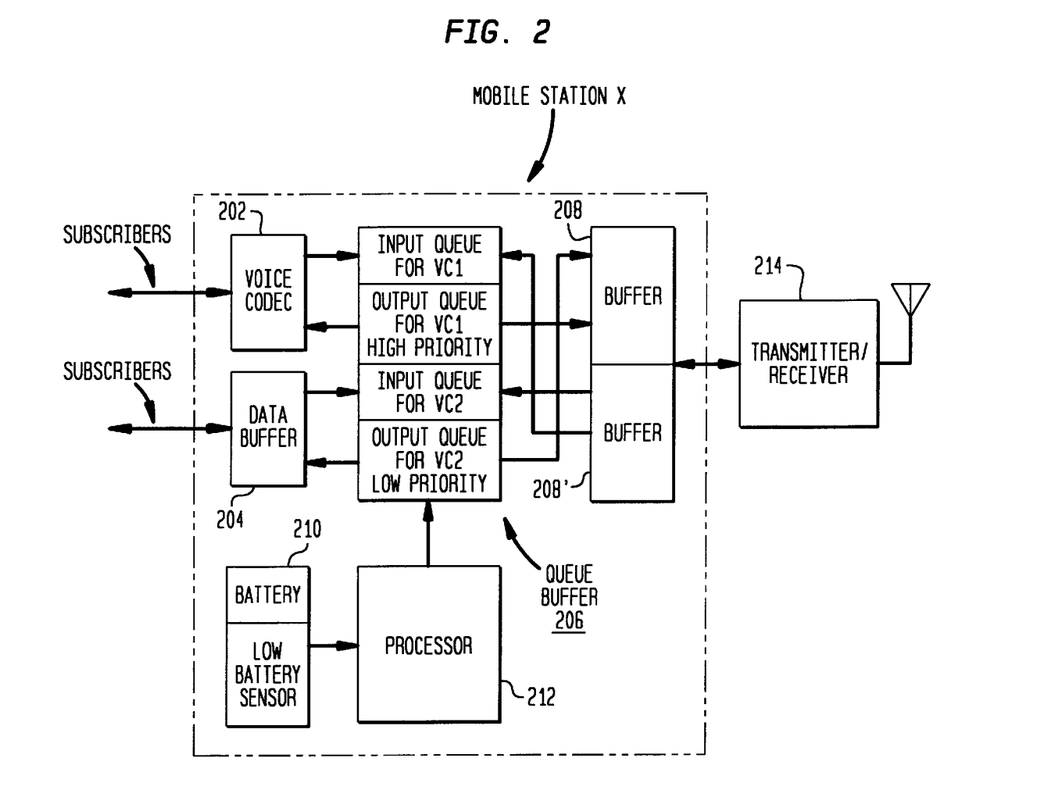
FIG. 2 is an architectural block diagram of the mobile station X, in accordance with the invention.

FIG. 2 is an architectural block diagram of the mobile station X, in accordance with the invention. A subscriber can exchange voice information using the voice CODEC 202 or data information using the data buffer 204. Both the voice CODEC 202 and the data buffer 204 have an interface to the queue buffer 206. The queue buffer 206 contains input and output queues for the virtual circuits VC1 and VC2. The output queue for VC1 is shown in a first example with a high priority and the output queue for VC2 is shown in the first example with a low priority. Outgoing messages in the output queues of buffer 206 are applied to the output buffer 208 for transmission by transmitter/receiver 214 to the base station B. Incoming messages in the input queues of buffer 206 are received from the input buffer 208', received by transmitter/receiver 214 from the base station B. The queue buffer 206 is controlled by the computer processor 212.

The battery that powers the mobile station X is monitored by the low battery sensor 210. The sensor 210 can measure the residual power level of the battery with a range of values. An example of a four increment range is "full power level", half-full power level, low power level, and nearly empty level. The measured residual power level of the battery is output by the sensor 210 to the processor 212. The processor 212 is programmed to prepare a battery status message in either the queue buffer 206 or in the output buffer 208, for transmission to the base station B. The battery status message includes the measured residual power level of the battery output by the sensor 210 to the processor 212. Queue status information can also be included in the battery status message, identifying the priority level of each virtual circuit output queue and other information. The battery status message can be prepared and sent on a periodic basis, or it can be sent only when a low battery condition is detected by the sensor 210.

Figure 3:
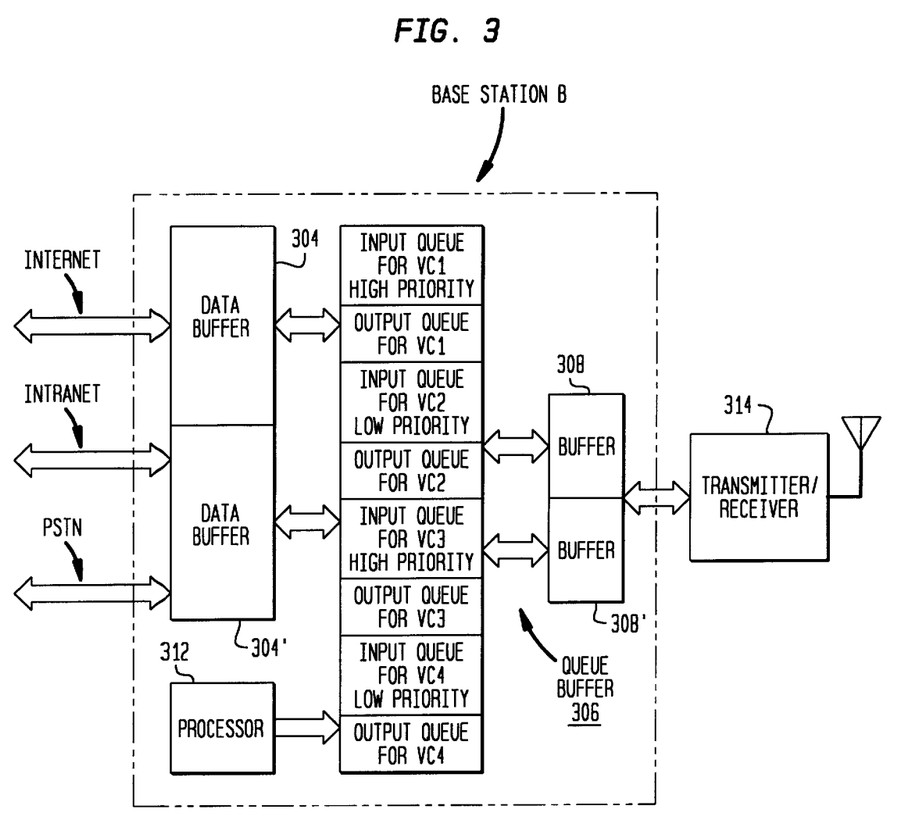
FIG. 3 is an architectural block diagram of the base station B, in accordance with the invention.

FIG. 3 is an architectural block diagram of the base station B, in accordance with the invention. Base station B uses input data buffer 304 and output data buffer 304' to exchange voice, video and data message traffic with the Internet, with intranet LANs and WANs, and with the public switched telephone network (PSTN). Base station B communicates the voice, video and data message traffic with mobile station X using input and output queues in queue buffer 306 for virtual circuits VC1 and VC2. Base station B communicates the voice, video and data message traffic with mobile station Y using input and output queues in queue buffer 306 for virtual circuits VC3 and VC4. Outgoing messages in the output queues of buffer 306 are applied to the output buffer 308 for transmission by transmitter/receiver 314 to the mobile stations. Incoming messages in the input queues of buffer 306 are received from the input buffer 308', received by transmitter/receiver 314 from the mobile stations. The queue buffer 306 is controlled by the computer processor 312.

Figure 4:
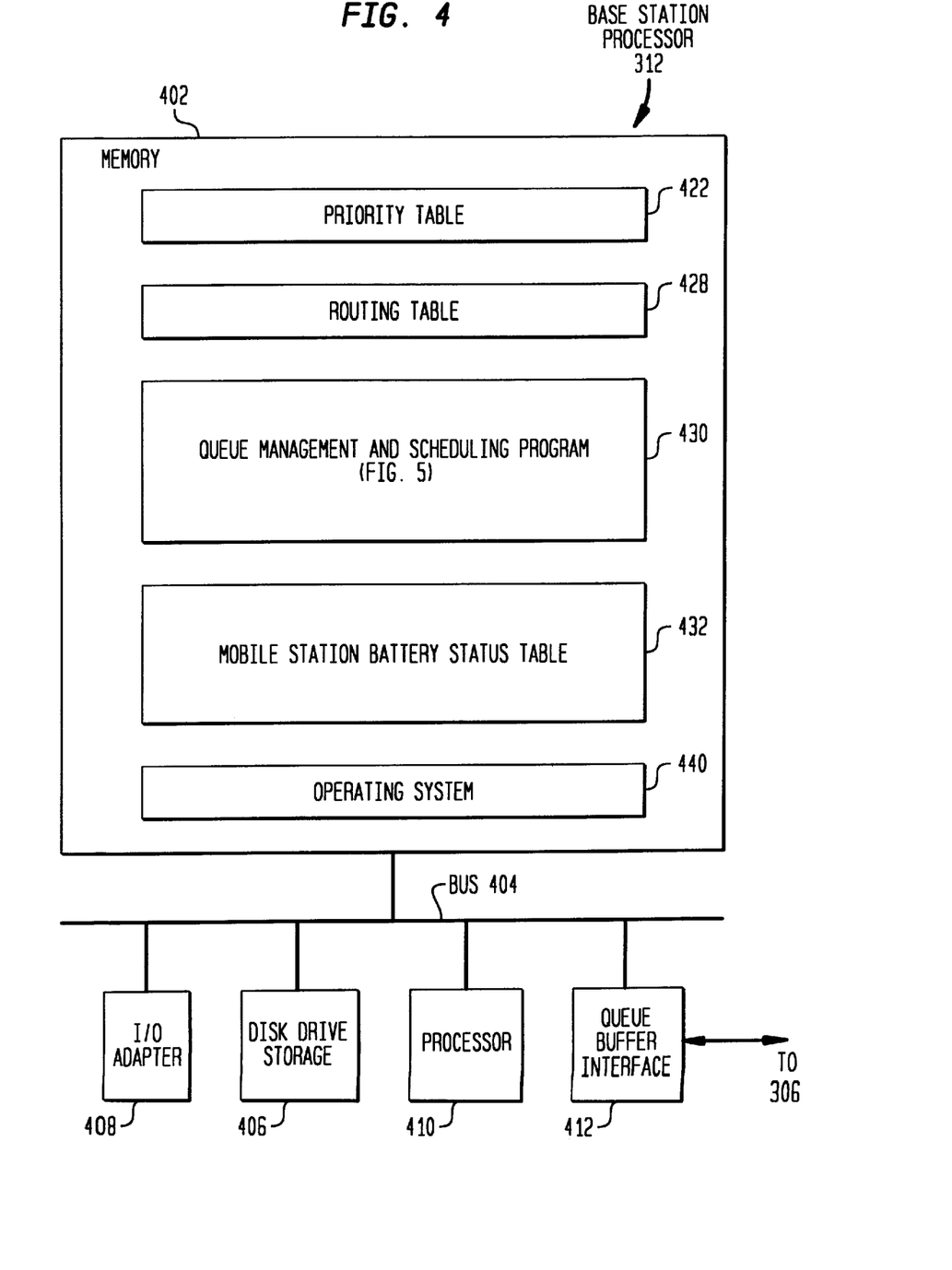
FIG. 4 is a more detailed architectural block diagram of the processor 312 in the base station B, in accordance with the invention.

FIG. 4 is a more detailed architectural block diagram of the processor 312 in the base station B, in accordance with the invention. Processor 312 includes the memory 402 connected by the bus 404 to the I/O adapter 408, the disk drive storage 406, the CPU processor 410 and the queue buffer interface 412. The queue buffer interface 412 is connected to the queue buffer 306. The memory 402 stores a priority table 422 that stores the priority values of the virtual circuit output queues for the mobile stations X and Y that are in active communication with the base station B. This is the queue status information that is included in the battery status message, identifying the priority level of each virtual circuit output queue The memory 402 stores a routing table 428 that routes messages between the mobile stations and the Internet, the intranet LANs and WANs, and with the public switched telephone network (PSTN). The memory 402 stores the queue management and scheduling program 430, shown in greater detail in FIG. 5. The memory 402 stores the mobile station battery status table 432 which stores the measured residual power level of the battery reported by the battery status message for each of the mobile stations X and Y that are in active communication with the base station B. And, the memory 402 stores the operating system program 440. The CPU processor 410 processes the program instructions and data that are stored in the memory 402.

Figure 5:
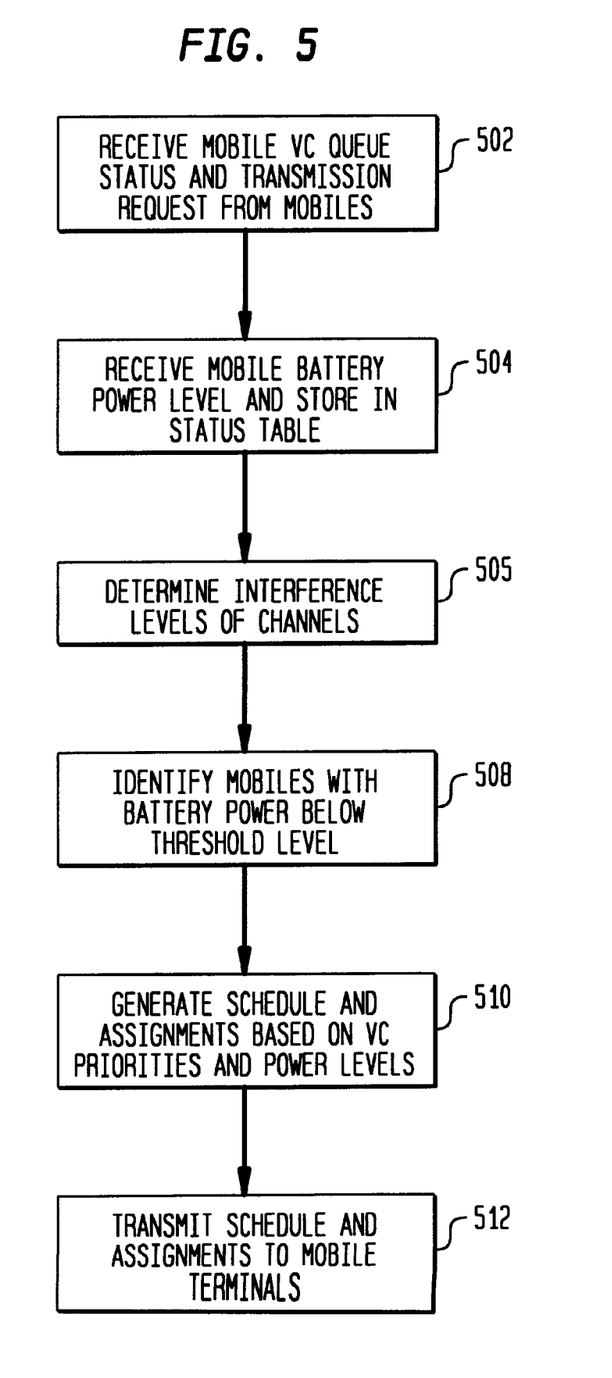
FIG. 5 is a flow diagram of the queue management and scheduling program 430 in the base station B, in accordance with the invention.

FIG. 5 is a flow diagram of the queue management and scheduling program 430 in the base station B, in accordance with the invention. The program starts at step 502, in which the base station receives mobile VC queue status and transmission request messages from the mobile stations. The processor 312 stores virtual channel priority values from these messages into the priority table 422. In step 504, the base station receives the mobile stations' battery power levels in battery status messages. The battery power levels are stored by processor 312 in the mobile station battery status table 432. In step 506, the base station determines the signal-to-interference ratio (SIR) of each frequency channel available to the base station. This determination is made in a well-known manner, by directly measuring SIR of occupied channels and estimating SIR based on measured interference levels of unoccupied channels. Preferably, this step is performed during the transmission of queue status and power level, when all the mobile stations are transmitting. Alternatively, this step may be performed at other times.

In step 508, the base station identifies mobile stations that have a battery power level below a threshold value. In step 510, the base station generates a new frequency channel assignment and new transmission schedule for the mobile stations that is based on the virtual channel priorities and the power levels of the mobile stations. In step 724, frequency channels are assigned to the mobile stations. Frequency channels are assigned based on the battery power level of each mobile station, the VC priority and on the interference level of each frequency channel. Those mobile stations having lower battery power levels are assigned to frequency channels having lower interference levels. This assignment scheme allows mobile stations having lower remaining battery power to achieve the target SIR, while transmitting at lower power. Transmitting at lower power conserves the remaining battery power of the mobile station, while achieving the target SIR reduces the transmission error rate and thus, the amount of retransmission of data that must occur.

Timeslots are assigned based on the VC priority, the VC queue status and the battery power level of each mobile station. Within a given priority level, those mobile stations having lower battery power levels are assigned to earlier timeslots. By advancing the scheduled transmission of messages from a mobile station whose battery power is low, those messages have a higher probability of successful transmission before the battery power level diminishes further.

In step 512, the base station transmits the new transmission schedule to the mobile stations.

Figure 6A:
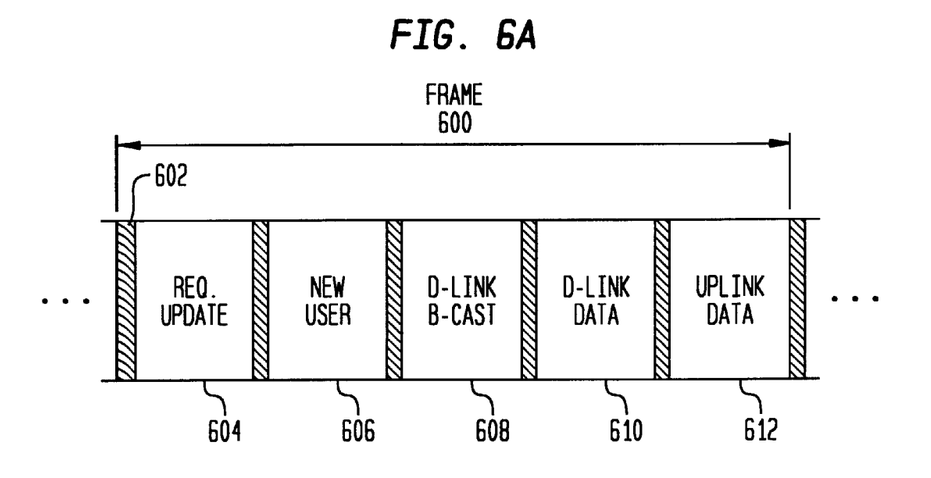
FIGS. 6A and 6B illustrate the time division multiple access frame 600, in accordance with the invention.
Figure 6B:
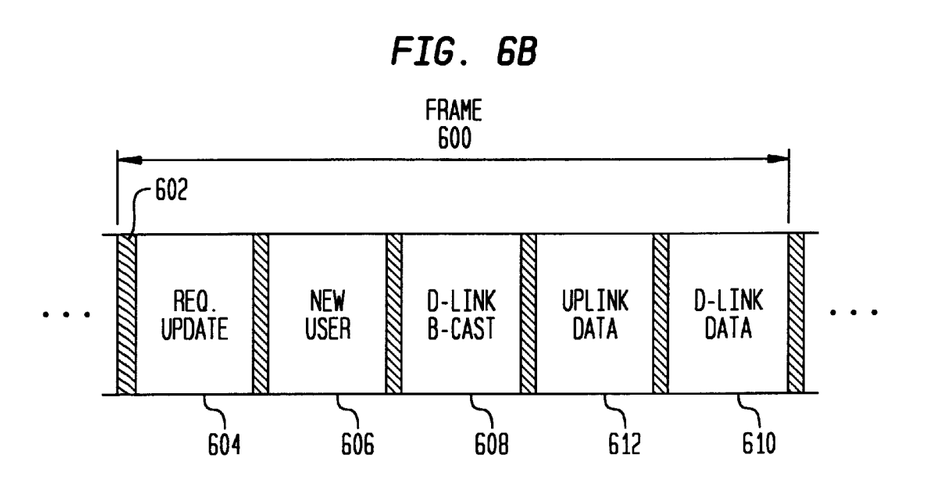

FIGS. 6A and 6B illustrate the time division multiple access frame 600, in accordance with the invention. FIG. 6A shows a first embodiment of the frame 600 which is, for example 30 milliseconds long. The frame 600 begins with a beacon synchronization slot 602 from the base station to the mobile stations. This is followed by a request update slot 604 containing the queue status and the battery status from the mobile stations to the base station, corresponding to steps 504 and 506 of FIG. 5. This is followed by a new user slot 606 from mobile stations that are attempting to start communications sessions with the base station. This is followed by the down-link broadcast slot 608 from the base station to the mobile stations, which sends the new transmission schedule, corresponding to step 512 of FIG. 5. This is followed by the down-link data slot 610 from the base station to the mobile stations, transmitting messages from the output queues of the queue buffer 306 of the base station to the mobile stations. This is followed by the up-link data slot 612 from the mobile stations to the base station, transmitting messages from the output queues of the queue buffer 206 of the mobile stations to the base station. The order of the messages in the up-link data slot 612 from the mobile stations to the base station is governed by the transmission schedule generated in step 510 of FIG. 5. FIG. 6B illustrates an alternate embodiment of the time division multiple access frame 600, where the up-link data slot 612 occurs before the down-link data slot 610, to enable low power mobile stations to send before they receive, thereby increasing the probability that they will have enough residual battery power to complete their transmission. The selection of either format of FIG. 6A or FIG. 6B is done under program control by the processor 312 at the base station.

Figure 7A:
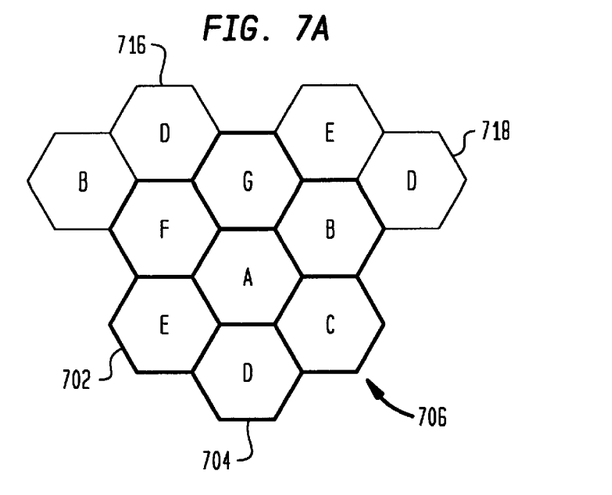
FIGS. 7A, 7B, 7C and 7D illustrate a first example of the operation of the invention.

An exemplary wireless network architecture is shown in FIG. 7a. This architecture is applicable to a variety of wireless networks, such as cellular, microcellular and picocellular networks, personal communication service (PCS) networks and wireless asynchronous transfer mode (ATM) networks. In the network of FIG. 7a, the service area of the network is divided into a plurality of cells, such as cells 702 and 704. Each cell represents a defined geographic region within the service area of the network. To reduce channel interference, and to improve frequency utilization, cells are grouped into clusters, such as cluster 706. The total available frequency channels are allocated among the cells in each cluster. Frequency re-use is achieved by replicating the allocation in neighboring clusters of cells. For example, each of the cells in cluster 706 is designated with a letter representing the set of frequencies that have been allocated to that cell. Since cluster 706 has seven cells, seven sets of frequencies have been allocated and are designated sets "A" through "G". Thus, cell 702 has been allocated frequency set E and cell 704 has been allocated frequency set D.

Figure 7B:
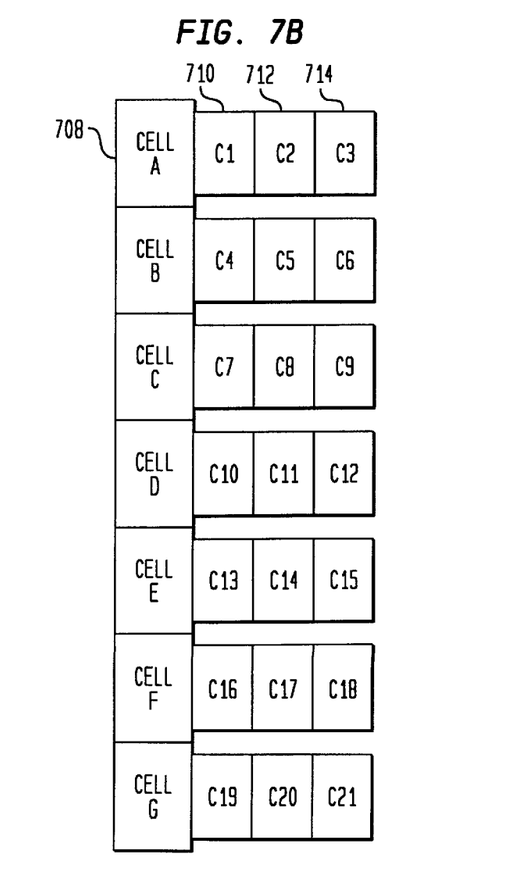

Referring briefly to FIG. 7b, an exemplary allocation of frequency channels among cells is shown. In this example, it is assumed that there are twenty-one allocable frequency channels and seven cells in a cluster. The invention, though, is applicable to networks having any number of cells and any number of frequency channels. Three frequency channels have been allocated to each set of frequencies. For example, to set A 708 have been allocated frequency channels C1 710, C2 712 and C3 714. Each set of frequency channels is disjoint. Thus, each frequency channel is allocated to only one set, and no set includes duplicate frequency channels. The actual frequency of each channel is selected so as to minimize interference among the channels in each cell, and among the channels in adjacent cells.

Returning to FIG. 7a, it is seen that each cell in a cluster is assigned one set of disjoint frequency channels. This assignment reduces interference among cells in a cluster. The assignment of frequency sets is arranged so that cells in different clusters, which have the same frequency set assignment, are sufficiently spatially separated to reduce interference. For example, cell 704 of cluster 706, which has been assigned frequency set "D", is spatially separated from cells 716 and 718, which are in neighboring clusters and which have also been assigned frequency set "D".

The number of cells in a cluster is determined depending upon the desired interference level. For example, in the GSM system, four cells constitute a cluster.

When a mobile station enters a new cell region—either as a new user or as a handed-off user—the base station of that cell assigns a channel to the mobile station. In addition, as power levels of the various mobile stations operating within the cell change with time, the base station of the cell reassigns channels so that the mobile stations that have the least power are assigned to the channels having lower interference levels that the mobile stations having higher power levels. This dynamic channel allocation process is carried out by queue management and scheduling program 430 in the base station B, which is shown in FIG. 5.

Figure 7C:
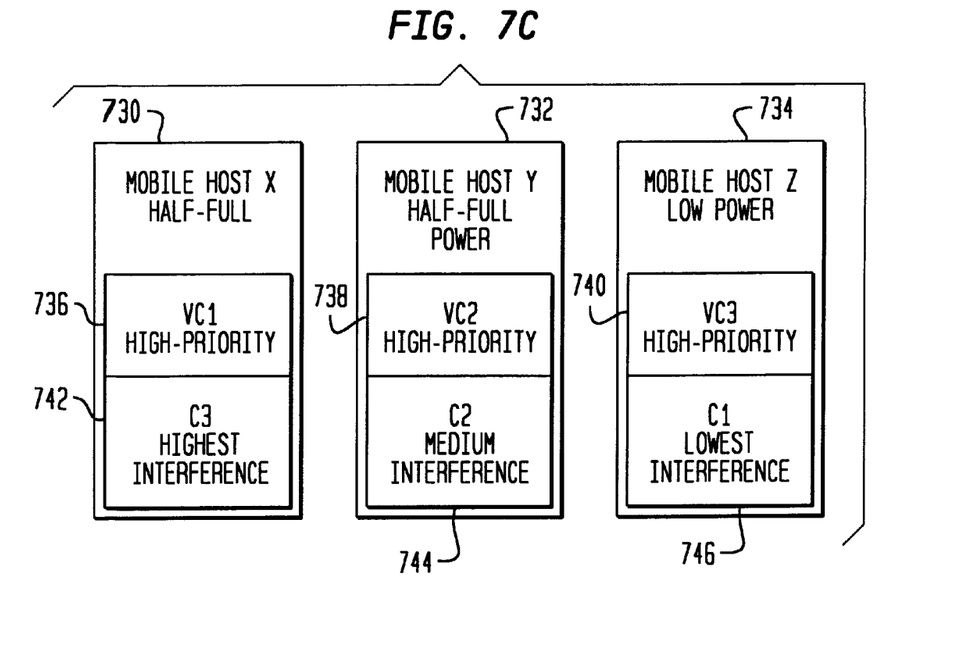

FIG. 7c illustrates a first example of the operation of the invention. FIG. 7c schematically shows three mobile stations X 730, Y 732, and Z 734. Each mobile station is shown with a queue buffer having one output queue and with a transmission frequency channel. Mobile station X has its battery at full power level and has the VC1 output queue 736 with a high priority. Mobile station Y has its battery at half-full power level and has the VC2 output queue 738 with a high priority. Mobile station Z has its battery at low power level and has the VC3 output queue 740 with a high priority.

Frequency channel C3 742 has the highest interference level, frequency channel C2 744 has a medium interference level and frequency channel C1 746 has the lowest interference level. As shown, channel C3 has been assigned to mobile station X, which has full power, channel C2 has been assigned to mobile station Y, which has half-full power, and channel C1 has been assigned to mobile station Z, which has low power.

Figure 7D:
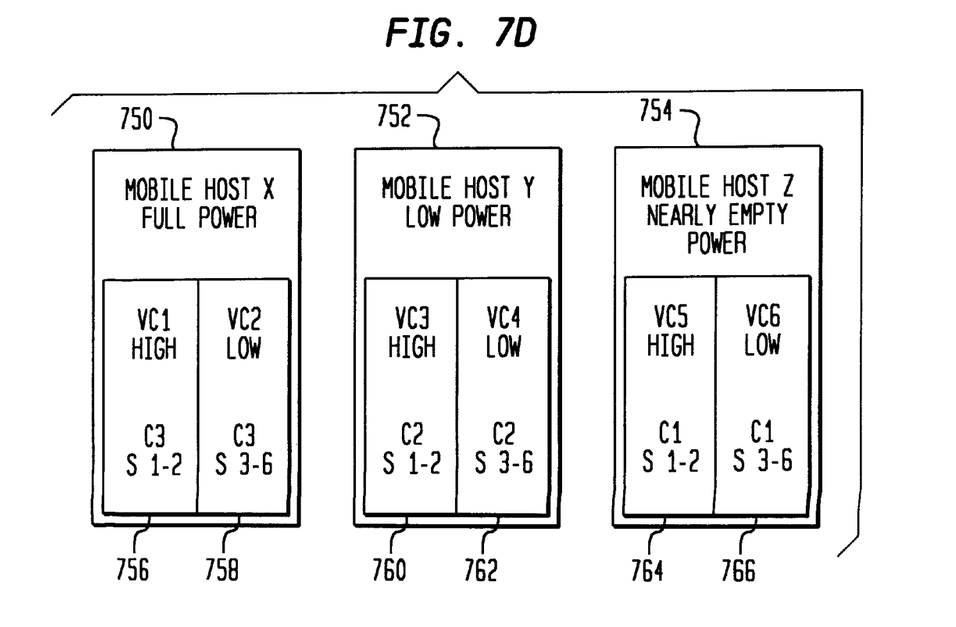

FIG. 7d illustrates a second example of the operation of the invention. FIG. 7d schematically shown three mobile stations X 750, Y 752 and Z 754. Each mobile station is shown with a queue buffer having two output queues. Mobile station X has its battery at full power level, has the VC1 756 output queue with a high priority and two slots and has the VC2 758 output queue with a low priority and four slots. Mobile station Y has its battery at low power level, has the VC3 760 output queue with a high priority and two slots and has the VC4 762 output queue with a low priority and four slots. Mobile station Z has its battery at nearly empty power level, has the VC5 764 output queue with a high priority and two slots and has the VC6 766 output queue with a low priority and four slots. As above, frequency channel C3 has the highest interference level, frequency channel C2 has a medium interference level and frequency channel C1 has the lowest interference level.

According to the present invention, the frequency channels have been assigned based upon the power levels of the mobile stations. As shown, mobile station X, which has full power, has been assigned channel C3, which has the highest interference level. Mobile station Y, which has low power, has been assigned channel C2, which has a medium interference level. Mobile station Z, which has nearly empty power, has been assigned channel C1, which has the lowest interference level. Likewise, VC1 has been assigned timeslots 1 and 2 on channel C3, VC2 has been assigned timeslots 3–6 on channel C3, VC3 has been assigned timeslots 1 and 2 on channel C2, VC4 has been assigned timeslots 3–6 on channel C2, VC5 has been assigned timeslots 1 and 2 on channel C1, and VC6 has been assigned timeslots 3–6 on channel C1.

In accordance with the invention, frequency channel assignments and scheduling priorities in a wireless communications system are adapted to conserve battery power in mobile stations operating within the system. In a preferred embodiment, a base station, within the system, receives battery power level information and other setup information from mobile stations operating within the service area of the base station during call setup procedures. Based on the battery power level information and other setup information, the base station adapts frequency channel assignments scheduling priorities for the mobile stations to expedite wireless transmissions from those mobile stations reporting low battery power levels.

Various illustrative examples of the invention have been described in detail. In addition, however, many modifications and changes can be made to these examples without departing from the nature and spirit of the invention.

What is claimed is:

1. A method of managing mobile stations in a wireless network, comprising the steps of:

receiving, at a base station, a signal from a first mobile station that its battery power is below a threshold value;

assigning, at the base station, a frequency channel to the first mobile station that has a lower interference level than frequency channels assigned to other mobile stations, in response to receipt of the signal; and transmitting the assignment to the first and other stations.

2. The method of claim 1, wherein the interference level of each frequency channel is based on the measured signal-to-interference ratio of each frequency channel.

3. The method of claim 1, further comprising the step of:

changing at the base station a mobile transmission schedule to cause transmission of messages from the first mobile station to occur before transmission of messages from other stations, in response to the signal.

4. The method of claim 3, wherein the first mobile station has a high priority message and a low priority message to transmit and the changing step comprises the steps of:

causing transmission of the high priority message to occur before transmission of high priority messages from other stations; and causing transmission of the low priority message to occur before transmission of low priority messages from other stations, but not before the transmission of high priority messages from other stations.

5. The method of claim 3, wherein the first mobile station has a first high priority message and a first low priority message to transmit and having its battery power below a first threshold value, the method further comprises the step of:

receiving at a base station a signal from a second mobile station that its battery power is below a second threshold value greater than the first threshold value, the second mobile station having a second high priority message and a second low priority message to transmit; and the changing step comprises the step of:

causing transmission of the messages to be ordered with the first high priority, followed by the second high priority, followed by high priority messages from other stations, followed by the first low priority, followed by the second low priority, followed by low priority messages from other stations.

6. A method of managing mobile stations in a wireless network, comprising the steps of:

receiving, at a base station, a signal from each of a plurality of mobile stations, each signal indicating a battery power level of a corresponding mobile station;

assigning, at the base station, a frequency channel to each mobile station based on the indicated battery power level of each mobile station and on the interference level of each frequency channel; and transmitting the assignment to each mobile station.

7. The method of claim 6, wherein the assigning step comprises the steps of:

assigning, at the base station, a frequency channel to each mobile station that has a battery power level lower than a threshold value, so that each such mobile station is assigned a frequency channel having a lower interference level than is assigned to a mobile station having a higher battery power level.

8. The method of claim 6, wherein the interference level of each frequency channel is based on the measured signal-to-interference ratio of each frequency channel.

9. The method of claim 6, further comprising the step of:

changing at the base station a mobile transmission schedule to cause transmission of messages from each mobile station having a battery power level lower than a threshold value to occur before transmission of messages from other stations, in response to the signal.

10. The method of claim 9, wherein a mobile station having a battery power level lower than a threshold value has a high priority message and a low priority message to transmit and the changing step comprises the steps of:

causing transmission of the high priority message to occur before transmission of high priority messages from other stations; and causing transmission of the low priority message to occur before transmission of low priority messages from other stations, but not before the transmission of high priority messages from other stations.

11. The method of claim 9, wherein a mobile station having a battery power level lower than a threshold value has a first high priority message and a first low priority message to transmit and having its battery power below a first threshold value, the method further comprises the step of:

receiving at a base station a signal from a second mobile station that its battery power is below a second threshold value greater than the first threshold value, the second mobile station having a second high priority message and a second low priority message to transmit; and the changing step comprises the step of:

causing transmission of the messages to be ordered with the first high priority, followed by the second high priority, followed by high priority messages from other stations, followed by the first low priority, followed by the second low priority, followed by low priority messages from other stations.

12. A system for managing mobile stations in a wireless network, comprising:

means for receiving at a signal from a first mobile station that its battery power is below a threshold value;

means for assigning a frequency channel to the first mobile station that has a lower interference level than frequency channels assigned to other mobile stations, in response to receipt of the signal; and means for transmitting the assignment to the first and other stations.

13. The system of claim 12, wherein the interference level of each frequency channel is based on the measured signal-to-interference ratio of each frequency channel.

14. The system of claim 12, further comprising:

means for changing a mobile transmission schedule to cause transmission of messages from the first mobile station to occur before transmission of messages from other stations, in response to the signal.

15. The system of claim 14, wherein the first mobile station has a high priority message and a low priority message to transmit and the changing means further comprises:

means for causing transmission of the high priority message to occur before transmission of high priority messages from other stations; and means for causing transmission of the low priority message to occur before transmission of low priority messages from other stations, but not before the transmission of high priority messages from other stations.

16. The system of claim 14, wherein the first mobile station having its battery power below a first threshold value has a first high priority message and a first low priority message to transmit, the system further comprises:

means for receiving a signal from a second mobile station that its battery power is below a second threshold value greater than the first threshold value, the second mobile station having a second high priority message and a second low priority message to transmit; and the changing means comprises:

means for causing transmission of the messages to be ordered with the first high priority, followed by the second high priority, followed by high priority messages from other stations, followed by the first low priority, followed by the second low priority, followed by low priority messages from other stations.

17. A system for managing mobile stations in a wireless network, comprising:

means for receiving a signal from each of a plurality of mobile stations, each signal indicating a battery power level of a corresponding mobile station;

means for assigning a frequency channel to each mobile station based on the indicated battery power level of each mobile station and on the interference level of each frequency channel; and means for transmitting the assignment to each mobile station.

18. The system of claim 17, wherein the assigning means comprises:

means for assigning a frequency channel to each mobile station that has a battery power level lower than a threshold value, so that each such mobile station is assigned a frequency channel having a lower interference level than is assigned to a mobile station having a higher battery power level.

19. The system of claim 17, wherein the interference level of each frequency channel is based on the measured signal-to-interference ratio of each frequency channel.

20. The system of claim 17, further comprising:

means for changing a mobile transmission schedule to cause transmission of messages from each mobile station having a battery power level lower than a threshold value to occur before transmission of messages from other stations, in response to the signal.

21. The system of claim 20, wherein a mobile station having a battery power level lower than a threshold value has a high priority message and a low priority message to transmit and the changing means comprises:

means for causing transmission of the high priority message to occur before transmission of high priority messages from other stations;

means for causing transmission of the low priority message to occur before transmission of low priority messages from other stations, but not before the transmission of high priority messages from other stations.

22. The system of claim 20, wherein a mobile station having a battery power level lower than a threshold value has a first high priority message and a first low priority message to transmit and having its battery power below a first threshold value, the system further comprises:

means for receiving a signal from a second mobile station that its battery power is below a second threshold value greater than the first threshold value, the second mobile station having a second high priority message and a second low priority message to transmit; and the changing means comprises means for causing transmission of the messages to be ordered with the first high priority, followed by the second high priority, followed by high priority messages from other stations, followed by the first low priority, followed by the second low priority, followed by low priority messages from other stations.

* * * * *